(12) United States Patent
Relenyi

(10) Patent No.: US 9,365,444 B2
(45) Date of Patent: Jun. 14, 2016

(54) FORMULATIONS FOR USE IN SULFUR SCALE CONTROL IN INDUSTRIAL WATER SYSTEMS

(75) Inventor: Attila G. Relenyi, Midland, MI (US)

(73) Assignee: AMSA, Inc, Auburn, MI (US)

(*) Notice: Subject to any disclaimer, the term of this patent is extended or adjusted under 35 U.S.C. 154(b) by 1113 days.

(21) Appl. No.: 13/001,363

(22) PCT Filed: Sep. 30, 2010

(86) PCT No.: PCT/US2010/002650
§ 371 (c)(1),
(2), (4) Date: Apr. 25, 2011

(87) PCT Pub. No.: WO2012/044274
PCT Pub. Date: Apr. 5, 2012

(65) Prior Publication Data
US 2012/0080641 A1  Apr. 5, 2012

(51) Int. Cl.
*C02F 5/10* (2006.01)
*C02F 5/12* (2006.01)
*C02F 1/50* (2006.01)
*C02F 101/10* (2006.01)

(52) U.S. Cl.
CPC ... *C02F 5/12* (2013.01); *C02F 1/50* (2013.01); *C02F 2101/101* (2013.01); *C02F 2101/40* (2013.01); *C02F 2303/08* (2013.01); *C02F 2303/12* (2013.01); *C02F 2305/04* (2013.01)

(58) Field of Classification Search
USPC ......... 210/699, 701, 764; 252/180, 181, 252/389.23, 389.54
See application file for complete search history.

(56) References Cited

U.S. PATENT DOCUMENTS

| | | |
|---|---|---|
| 3,291,683 A | 12/1966 | Lamb |
| 3,524,719 A | 8/1970 | Wolf et al. |
| 4,032,360 A | 6/1977 | Sharp |
| 4,816,061 A | 3/1989 | Walter, Jr. et al. |
| 4,982,004 A * | 1/1991 | Relenyi et al. ............... 564/488 |
| 5,025,038 A | 6/1991 | Relenyi et al. |
| 6,183,649 B1 * | 2/2001 | Fontana ....................... 210/699 |
| 6,260,561 B1 * | 7/2001 | Gartner et al. ............ 134/22.16 |
| 6,315,045 B1 | 11/2001 | Brezinski |
| 2003/0062316 A1 | 4/2003 | Mattox |
| 2005/0061197 A1 | 3/2005 | Nalepa |
| 2008/0142453 A1 | 6/2008 | Unhoch |

FOREIGN PATENT DOCUMENTS

| | | | |
|---|---|---|---|
| GB | WO2005/014491 | * | 2/2005 |
| WO | 2005/014491 A1 | | 2/2005 |

OTHER PUBLICATIONS

Watanabe, et al., J. Amer. Oil Chemists Soc. 68, 44-46 (1991).
Kudo et al., Proceedings World Geothermal Congress 2000, Kyushu-Tohoku, Japan, May 28-Jun. 10, 2000, pp. 3205-3209.

* cited by examiner

*Primary Examiner* — Monique Peets
(74) *Attorney, Agent, or Firm* — Technology Law; Karen L Kimble

(57) ABSTRACT

Formulations of the present invention contain compounds of Formula (I) that are used as Sulfur Scale Inhibition and/or Removal Agents in the treatment of Industrial Water Systems.

18 Claims, 15 Drawing Sheets

FORMULATIONS FOR USE IN SULFUR SCALE CONTROL IN INDUSTRIAL WATER SYSTEMS

CROSS REFERENCE TO RELATED APPLICATION

This application claims priority from all the following listed application and is a national phase application from International Application PCT/US2010/002650, filed 30 Sep. 2010.

BACKGROUND OF THE INVENTION

1. Field of the Invention

The present invention is directed to formulations for use as sulfur scale removal and inhibition agents in the treatment of pipelines and other water processing equipment used in various industrial water systems, for example including but not limited to geothermal energy production cooling towers, secondary oil recovery systems, Frasch process sulfur mining, and industrial cooling towers.

2. Description of Related Art

The presence of sulfur in industrial water systems has posed many problems, such as corrosion of the pipes, blockage of the flow of the liquid, slurry or gas through pipes, and loss of efficiency in the transport through the system, including heat transfer. In geothermal systems, sulfur deposition is particularly problematic as the sulfur deposits build up on the spray nozzles in cooling towers (see for example FIGS. 1 and 2) that are an integral part of electricity production that consists of geothermal steam pressure to drive electricity producing turbines.

The sulfur deposition in a water distribution system in geothermal applications causes the subsequent fouling of heat exchanger elements of the electric utility. In particular, sulfur deposit formation on the surfaces of the cooling tower "packing" or "fill" thereby causes low flow or total blockage of water flow in the cooling medium (see FIG. 3).

The low flow or no flow condition caused by these sulfur deposits in turn facilitates the buildup of organic deposits. These organic deposits are composed predominantly of polysaccharides and proteins which are generated by microorganisms, in particular slime producing bacteria. Therefore the control of sulfur deposition is essential as it is the first step in a series of processes that lead to inefficient operation of the electric power plant. If these deposits build up in the cooling tower fill, the entire physical structure can collapse, which is not an uncommon occurrence. Clearly, at the very least such an event is a costly repair with loss of electrical output.

In addition, the Frasch process for sulfur mining involves processing of sulfur with hot water. Such a system also benefits from sulfur deposit removal in the piping and equipment, thus aiding in plant operations.

With regard to iron sulfide as a sulfur deposit, its presence in industrial water systems has posed many problems, such as under-deposit corrosion of the pipes, blockage of the flow of the liquid, slurry or gas through pipes, clogging of filtration systems, and loss of efficiency in the transport through the system. In particular, the control of iron sulfide deposition in the piping of oil production is key to the efficiency of oil production. These iron sulfide deposits can not only be blocking to water flow and oil flow, but the piping can corrode or deteriorate to the point that a new producing well or return water well has to be drilled or repaired. These events can be expensive and time consuming to repair. Iron sulfide deposits may result not only from corrosion of iron-containing materials of construction, but from reaction of iron and iron compounds that occur naturally in the water system with hydrogen sulfide or other sulfur compounds.

Once the sulfur scale has formed, mechanical treatments to remove sulfur deposits from these industrial systems have used scrapers, sponge balls or "pigs" and various chemicals. These methods cause the sulfur deposit to be loosened and further contaminate the system in other locations in the system. Also various chemical methods have been tried but nothing to date has met with commercial success.

U.S. Pat. No. 5,025,038 describes an antimicrobial composition for use as a biocide where the active ingredient is 2-(alkylthio)ethanamine hydrohalide. The patent describes a formulation for use as a biocide. No other use is taught. U.S. Pat. No. 4,982,004 describes a process to make the compounds of U.S. Pat. No. 5,025,038.

U.S. Pat. No. 4,816,061 describes a composition to control biofouling using alkylthioalkylamines, such as n-decylthioethylamine, and its hydrochloride salt. The active is used as a biocide. The composition is not used or taught for sulfur scale removal.

U.S. Pat. No. 3,524,719 describes organic amines combined with N,N"-(hexachlorobiphenylene)bis(ethylenediamine) or 1,1'-(hexachlorobiphenylene)-bis(ethylenediamine) for use in inhibiting metal corrosion. There are no salts of these amines discussed. These compounds are used for corrosion inhibition only. Removal or dispersal of corrosion products such as iron sulfide from surfaces is not taught by this patent. Inhibition of iron sulfide deposition from reaction of naturally occurring iron with sulfur compounds also is not taught by this patent.

U.S. Pat. No. 6,260,561 describes the use of aliphatic amines for cleaning swimming pools and spas. The focus of the patent is the problem of flocculus or deposits resulting from dissolved minerals in swimming pools, spas, or other receptacles holding water. Also taught is antimicrobial activity. It teaches that a thioethylamine analog has inferior performance compared to their claimed aliphatic compounds. The prevention or removal of sulfur deposits is not taught.

WO 2005/014491 describes etheramines and their nitriles for water treatment for use as biocides of sulfate reducing bacteria (SRBs) as well as other problematic aerobic microorganisms in oilfield applications and in industrial water systems, although they do not show any support for these latter uses. SRBs produce $H_2S$ from sulfates. $H_2S$ is a problem due to odor, toxicity, and corrosivity. The presence of $H_2S$ leads to plugging of lines by the formation of and precipitation of metal sulfides. This problem, the formation of $H_2S$ by bacteria, is commonly treated with biocides that kill the bacteria or prevent the bacteria from producing $H_2S$. This reference does not teach inhibition or removal of elemental sulfur deposits; however, it teaches how to kill the bacteria. Additionally, there is no teaching of iron sulfide removal or dispersal.

S. Watanabe, et al., in *J. Amer. Oil Chemists Soc.* 68, 44-46 (1991), describe the testing of amines as a component of aqueous cutting fluid used in metal machining operations that showed excellent corrosion resistance of iron, excellent lubricity (wear resistance), and fair antimicrobial properties in spent coolant solutions. There was no discussion of sulfur deposit removal or inhibition.

U.S. Pat. No. 3,291,683 describes controlling fungi and bacteria with alkoxy or alkylthio alkylamine ethers. This patent's focus is biocide use.

U.S. Pat. No. 4,032,360 describes diamines with a carbon chain derived from a higher fatty acid for use in iron sulfide removal in oil-containing systems. It was not used in industrial water systems. There was no discussion of sulfur deposit removal or inhibition.

S. Kudo and T. Yano in *Proceedings World Geothermal Congress* 2000, *Kyushu—Tohoku, Japan*, May 28-Jun. 10, 2000, pp. 3205-9 describe the use of a sulfur scale abatement system using a surfactant in geothermal power plant circulating water. The composition of the surfactant was described only as a "common industrial, anti-bacterial reagent." There is no further disclosure of the reagent.

Clearly, it would be desirable to find a formulation that would prevent sulfur deposit formation and permit the substantial removal of sulfur deposits from industrial water systems and pipelines.

BRIEF SUMMARY OF THE INVENTION

The present invention relates to a method which comprises Sulfur Scale Control in Industrial Water Systems using a formulation, comprising, as the active ingredient, at least one compound of Formula (I)

wherein:
R is a straight chain or branched chain $C_6$-$C_{24}$ alkyl or a straight chain or branched chain $C_6$-$C_{24}$ alkyloxy-$C_2$-$C_3$-alkyl;
$R^1$ is a straight chain or branched chain $C_2$-$C_4$ alkyl; and
X is S, O or N—$R^2$ wherein $R^2$ is H or a straight chain or branched chain $C_1$-$C_8$ alkyl; or
the organic or inorganic acid addition salts thereof; and
optionally one or more Other Ingredients are included to form a Sulfur Scale Control formulation.

These formulations are especially useful in Industrial Water Systems. Preferably these formulations are used as Sulfur Scale Removal Agents.

Preferred formulations of Formula (I) are those where R is a straight chain or branched chain $C_6$-$C_{16}$ alkyl or more preferred $C_8$-$C_{14}$ alkyl. Other preferred formulations have X is S or O. One compound that has been tested is 2-(decylthio) ethanamine hydrochloride.

This formulation containing compounds of Formula (I) as the active ingredient is useful in Sulfur Scale Control in Industrial Water Systems. Especially preferred are geothermal systems, reinjection water such as produced water from oil production, flooding water used in secondary oil recovery, and Frasch process sulfur mining. The various capitalized terms above are defined in the glossary below.

This invention provides a method of using this present formulation to remove Sulfur Scale in these various systems after it has formed and to subsequently disperse and float the deposits. The formation of new Sulfur Scale in such systems additionally is inhibited by the present formulation.

DETAILED DESCRIPTION OF THE INVENTION

Glossary

The following terms as used in this application are to be defined as stated below and for these terms, the singular includes the plural.

"Sulfur" means elemental sulfur, polysulfides, sulfide salts, including but not limited to iron sulfide (e.g. FeS and $Fe_2S_3$), mercaptans, and other sulfur derivatives, both organic and inorganic. Elemental sulfur may be naturally occurring in the Industrial Water System or it may be formed in the system by oxidation of hydrogen sulfide. Hydrogen sulfide may be naturally occurring in the Industrial Water System or produced in the system by microbial reduction of sulfate ion.

"Sulfur Scale" means Sulfur as a deposit on a surface.

"Sulfur Scale Control" means the method of using the present formulation as an Inhibition Agent and/or a Removal Agent.

Figure 1:
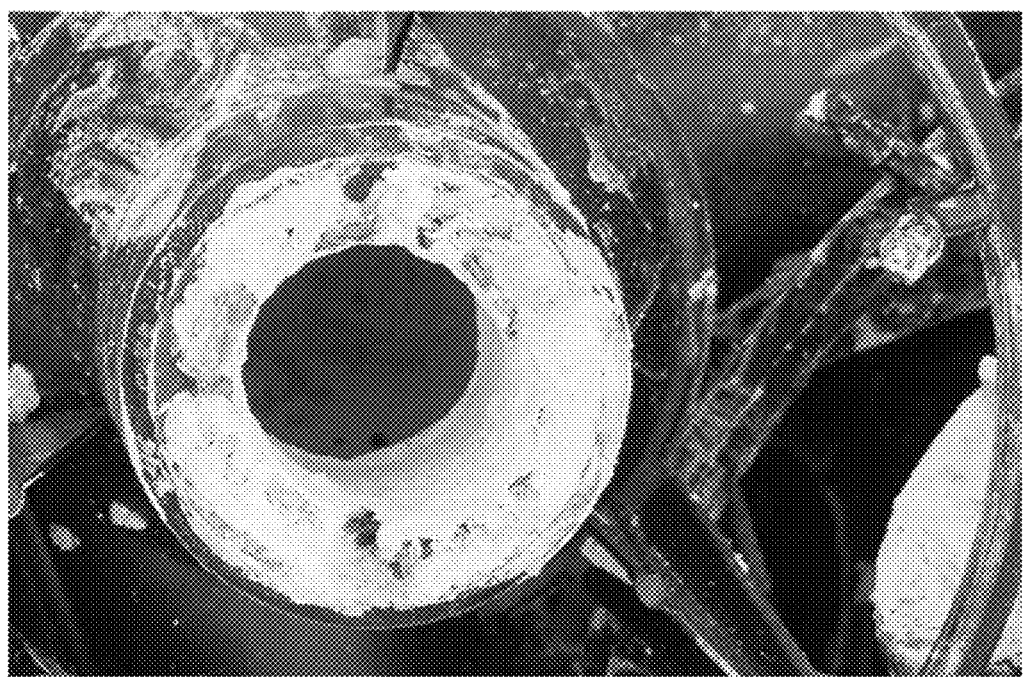
FIG. 1 is a photograph that shows the Sulfur deposits as Sulfur Scale in a nozzle that result in poor water spray patterns.
Figure 2:
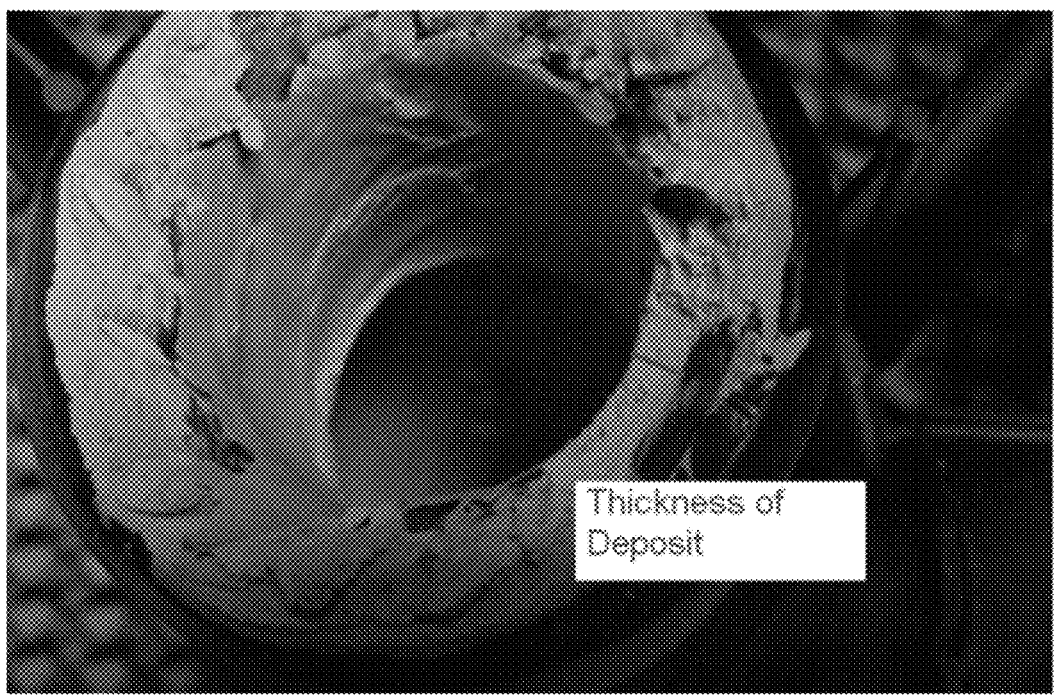
FIG. 2 is a photograph that shows a Sulfur fouled nozzle deposit and that it is quite thick.

"Sulfur Scale Removal" means the reduction of Sulfur Scale from its existing level, in an Industrial Water System, such that less Sulfur Scale remains visible to the human eye in the pipes and the water tests with an increase in the Sulfur in the discharge water as determined, for example, by turbidity measurements. Especially in geothermal systems, the amount of Sulfur Scale can be significant (see FIG. 2).

"Industrial Water Systems" means industrial systems that are exposed to water and contain or form Sulfur Scale including but not limited to cooling towers (including all surfaces exposed to water such as piping, water transfer lines, spray nozzles, tower fill or tower packing, and basin), paper mills, metal working fluids, Frasch process sulfur mining systems, reinjection water such as produced water from oil production, flooding water used in secondary oil recovery, heat exchangers (such as direct contact heat exchanger or a plate and frame exchanger), geothermal systems, fluid coolers, hydrotesting of pipelines, water treatment or purification plants and equipment, including reverse osmosis membranes, ultrafiltration or ion exchange.

"Inhibition Agent" means the formulation having compounds of Formula (I) used to minimize or prevent the formation of Sulfur Scale in Industrial Water Systems, including but not limited to inhibiting the deposition of metal sulfides which form from solubilized metal ions and $H_2S$ or from solubilized metal ions and sulfides.

"Removal Agent" means the formulation having compounds of Formula (I) used to loosen or break up Sulfur Scale in Industrial Water Systems and cause their removal. The process of removal may begin at the very inception of Sulfur Scale deposition on surfaces.

"Other Ingredients" means water, solvents, excipients, diluents, or additives (such as biocides, stabilizers, surfactants, corrosion inhibitors, scale inhibitors, and/or antifoaming agents) for use in Industrial Water Systems. Common chemicals as other ingredients used in Industrial Water System formulations are described in *Water Treatment Chemicals. An Industrial Guide*, by Ernest W. Flick (1991, Noyes Publications, New York), which is hereby incorporated by reference. Such Other Ingredients can optionally be included in the present formulation or may have one or more included in the present formulation.

"HEDP" means (1-hydroxy ethylidene-1,1-diphosphonic acid).

"SRBs" means sulfate reducing bacteria.

The present formulation provides a simple and convenient way to control Sulfur Scale in Industrial Water Systems. This can be done as a cleaning procedure after the system has Sulfur Scale deposited where the formulation having Formula (I) functions as a Removal Agent. As part of this cleaning procedure or overall inhibition procedure, the formulation provides dispersion and/or floatation of the Sulfur Scale.

The present formulation having Formula (I) may have one or more Other Ingredients added. For example, optional addition of biocides to the present formulation can provide a further treatment of the secondary organic sulfur deposits resulting from microorganisms in the system. Additionally, Other Ingredients are corrosion inhibitors (such as phosphonates like HEDP), scale inhibitors (such as polyacrylates), or dispersants (such as ethylene oxide/propylene oxide copolymers, sometimes called "EO/PO copolymers"). Some Other Ingredients that are inert which may be present in the present formulation are surfactants, antifoams, solvents (such as water or hydrocarbon solvents), diluents, and/or excipients. The present formulation can be in the form of a liquid, emulsion, suspension, or solid such as a granule or tablet. It is also possible that no Other Ingredients are added.

Preferably the present formulation contains compounds of Formula (I) where X is S or O. The preferred alkyl groups are where R is a straight chain or branched chain $C_6$-$C_{16}$ alkyl or more preferred $C_8$-$C_{14}$ alkyl. One compound that has been tested is 2-(decylthio)ethanamine hydrochloride.

The preferred salts of the compounds of Formula (I) are acid addition salts formed from hydrochloric acid, hydrobromic acid, sulfuric acid, phosphoric acid, acetic acid, citric acid, propionic acid, or derivatives of phosphonic acid, for example HEDP.

The formulation is packaged in a concentration having a range of about 0.1 to about 100% by wt, preferably from about 5 to about 90% by wt, more preferably from about 15 to about 30% by wt based on active ingredient of Formula (I). This formulation is used in the present method in concentrations ranging from about 0.1 to 10,000 ppm, preferably from about 1 to about 500 ppm, and more preferably from about 5 to about 50 ppm of the active of Formula (I), in the water being treated in the Industrial Water System.

Many Industrial Water Systems that have hydrogen sulfide present can develop Sulfur Scale problems that could be treated with the present formulation. Sulfur Scale, when present as elemental sulfur, can result from hydrogen sulfide under various conditions, such as: (a) oxidation of hydrogen sulfide by bacteria; and (b) chemical oxidation of hydrogen sulfide by oxygen in the air or other oxidants. Sulfur Scale, when present as iron sulfide, can result from corrosion of iron-containing materials of construction by hydrogen sulfide followed by deposition of the resulting iron sulfide corrosion products. Hydrogen sulfide can also react with naturally occurring iron and iron compounds in the water system to form iron sulfide deposits. The present formulation can inhibit or remove Sulfur Scale regardless of its source, including naturally occurring Sulfur Scale.

Fluid coolers are hybrids that pass the working fluid through a tube bundle, upon which clean water is sprayed and a fan-induced draft applied. The resulting heat transfer performance is much closer to that of a wet cooling tower, with the advantage provided by a dry cooler of protecting the working fluid from environmental exposure. This has reduced to some extent the release of $H_2S$ gas to the environment but does not solve the other problems of sulfur deposits.

Figure 5:
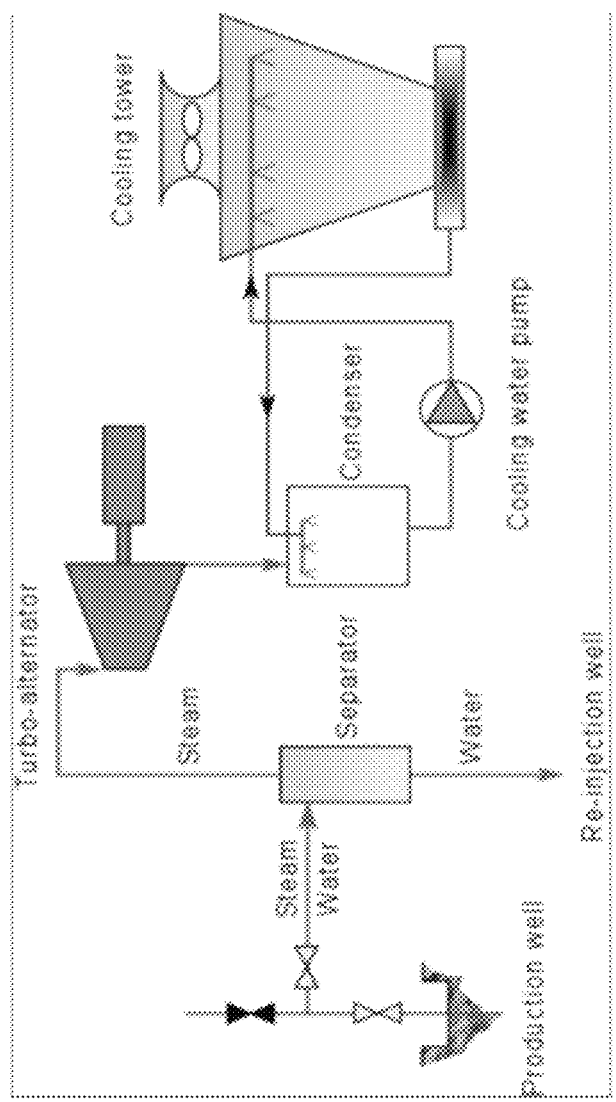
FIG. 5 is a schematic diagram of a geothermal system (Source: Dickson and Fanelli, 2003, at http://www.geothermal-energy.org/314,what_is_geothermal_energy.html).

Sulfur Scale forms on many surfaces of the Industrial Water System, especially geothermal systems, such as tower packing, nozzles, and pipes (see FIG. 5, on right side, which is downstream from the turbo-alternator). Once it starts depositing such as on tower packing, it clogs the flow and the deposition rate increases very fast. The deposit is heavy and can crush the packing over time, which is very costly for parts, time loss for repair, and energy production loss. Also, after poor water distribution happens, the chemical volume usage increases (with environmental issues and costs), and loss of power production (serious economic issue). Thus the recirculation of the water (see FIG. 5) between the condenser and the cooling tower is less efficient.

A further advantage of the compounds of Formula (I) are that they are not generally reactive to high temperatures, $NH_3$, and $H_2S$. Thus they provide an economical and efficient method under such conditions of Sulfur Scale Control. The waters of the Industrial Water System which contain compounds of Formula (I) are eventually drained or discharged to water treatment facilities, municipal drain systems or into surface waters. Thus the present compounds of Formula (I) where X is S or O are particularity desirable as they are biodegradable.

When Sulfur Removal is performed in a cooling tower, especially geothermal systems, using this present formulation, water carries the Sulfur deposits to the basin from which the water is recirculated. The Sulfur deposits can be removed from the basin with some of the water by draining or vacuuming.

Sulfur Scale Control is also useful in gas and oil production which is another Industrial Water System in the present context. In such a production system, Sulfur Scale such as iron sulfide deposits frequently occur. Such iron sulfide deposits result indirectly from corrosion of iron-containing materials of construction in these systems by hydrogen sulfide. In addition, iron sulfide deposits result from reaction of naturally occurring iron and iron compounds in the water with Sulfur or hydrogen sulfide. Deposit formation may be prevented indirectly by corrosion inhibitors which function by inhibition of chemical erosion or disintegration of metal surfaces (e.g. upon loss of metal mass from corrosion). The corrosion products, such as iron sulfide, are often insoluble in water and can deposit on surfaces. In contrast, the present formulation is used for Sulfur Scale Control such as removing iron sulfide deposits. When the deposit is removed, the present formulation inhibits the formation of further deposits. While it is known that these compounds of Formula (I) can be used as corrosion inhibitors, it has now been surprisingly found that this present formulation both removes deposits of corrosion products (such as iron sulfide) and prevents such deposit formation.

Water injection refers to the method in oil industry where water is injected back into the reservoir, usually to increase pressure and thereby stimulate production. Water injection wells can be found both on- and offshore, to increase oil recovery from an existing reservoir. Normally only 30% of the oil in a reservoir can be extracted, but water injection increases that percentage (known as the recovery factor) and maintains the production rate of a reservoir over a longer period of time. Any and every source of bulk water can be, and has been, used for such injection. The following sources of water are used for recovery of oil:

Produced water is often used as an injection fluid. This reduces the potential of causing formation damage due to incompatible fluids, although the risk of Sulfur Scale or corrosion in injection flowlines or tubing remains. Also, the produced water, being contaminated with hydrocarbons and solids, must be disposed of in some manner, and disposal to sea or river will require a certain level of clean-up of the water stream first. However, the processing required to render produced water fit for reinjection may be equally costly. As the volumes of water being produced are never sufficient to replace all the production volumes (oil and gas, in addition to water), additional "make-up" water must be provided.

Mixing waters from different sources exacerbates the risk of Sulfur Scale. Seawater is obviously the most convenient source for offshore production facilities, and it may be pumped inshore for use in land fields. Where possible, the water intake is placed at sufficient depth to reduce the concentration of algae; however, filtering, deoxygenation and biociding is generally required.

Aquifer water from water-bearing formations other than the oil reservoir, but in the same structure, has the advantage of purity where available.

River water will always require filtering and biociding before injection.

Reinjection water such as discussed above is another example of Industrial Water Systems where the present formulation is used for Sulfur Scale Control.

A hydrostatic test (hydrotesting of pipelines) is a way in which leaks can be found in pressure vessels such as pipelines and plumbing. The test involves placing water, which is often dyed for visibility, in the pipe or vessel at the required pressure to ensure that it will not leak or be damaged. It is the most common method employed for testing pipes and vessels. Using this test helps maintain safety standards and durability of a vessel over time. Newly manufactured pieces are initially qualified using this hydrostatic test. They are then continually re-qualified at regular intervals using the proof pressure test which is also called the modified hydrostatic test. Hydrostatic testing is also a way in which a gas pressure vessel, such as a gas cylinder or a boiler, is checked for leaks or flaws. Testing is very important because such hydrotesting of pipe, pipelines and vessels is done to expose defective materials that have missed prior detection, ensure that any remaining defects are insignificant enough to allow operation at design pressures, expose possible leaks and serve as a final validation of the integrity of the constructed system.

Hydrotesting of pipelines is another example of Industrial Water Systems where the present formulation is useful for Sulfur Scale Control.

Figure 6:
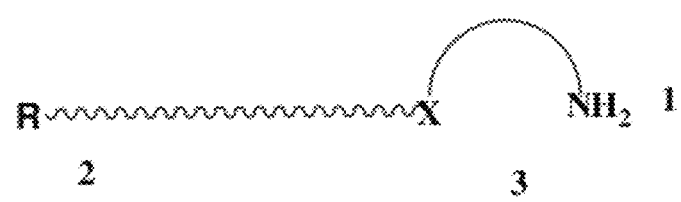
FIG. 6 is a general depiction of compounds of Formula (I) where 1 is the amine group and hydrophilic head, 2 is the lipophilic tail where R is alkyl, and 3 is the bidentate chelating unit.

While not wishing to be bound by theory, it is believed that the compounds of Formula (I) have unique properties that make them function better than any previously known prior art compound for use in Sulfur Scale Control, especially as Sulfur Removal Agents. These compounds are multifunctional, exhibiting three key features:

1. Amphiphilicity. Amphiphilic compounds have a polar, hydrophilic head (see FIG. 6, region 1) and a non-polar, lipophilic tail (see FIG. 6, region 2). This is represented by a general depiction for compounds of Formula (I) as shown in FIG. 6. This property:
   a. Facilitates absorption of compounds of Formula (I) on the surface of non-polar sulfur deposit at the interface with the polar aqueous medium. The non-polar end of the molecule interacts with the sulfur deposits and the polar end interacts with the water which facilitates dispersion and removal of the deposit. In addition, this property results in crystal habit modification of sulfur particles, reducing aggregation, and inhibiting subsequent deposit formation.
   b. Facilitates formation of a protective layer at the interface of clean surfaces and water to inhibit sulfur deposition.
   c. Provides solubility in both aqueous and organic materials so it is effective for preparing a commercial formulation.
2. Reactive amine group (see FIG. 6, region 1). Primary amines react with sulfur to form water soluble or dispersible polysulfides.
3. Bidentate chelating unit (see FIG. 6, region 3). Binds with cations such as iron in iron sulfide deposits to aid solubilization and dispersion in water and inhibit deposition.

Prior agents that are biocides when used in Industrial Water Systems behave as biocides for the control of bacteria that produce hydrogen sulfide and, subsequently, elemental sulfur. However hydrogen sulfide and sulfur can occur by other, abiotic processes. Thus these compounds of Formula (I) behave very differently as chemical and physical agents to both inhibit and remove Sulfur Scale regardless of the source.

These formulations are effective Sulfur Scale Removal Agents as well as effective Sulfur Scale Inhibition Agents, preventing the buildup of new deposits by removing them as they begin to form. Thus, after treatment to remove existing Sulfur Scale, treatment may be continued in order to inhibit new deposits and maintain clean surfaces. Thus, a short-time use is usually effective for Sulfur Scale Removal ("slug dose") and a continuous or semi-continuous use is effective for Sulfur Scale Inhibition ("continuous dose"). Clearly, the present formulations provide an effective method for Sulfur Scale Control.

The invention will be further clarified by a consideration of the following examples, which are intended to be purely exemplary of the present invention.

Example 1

Figure 7A:
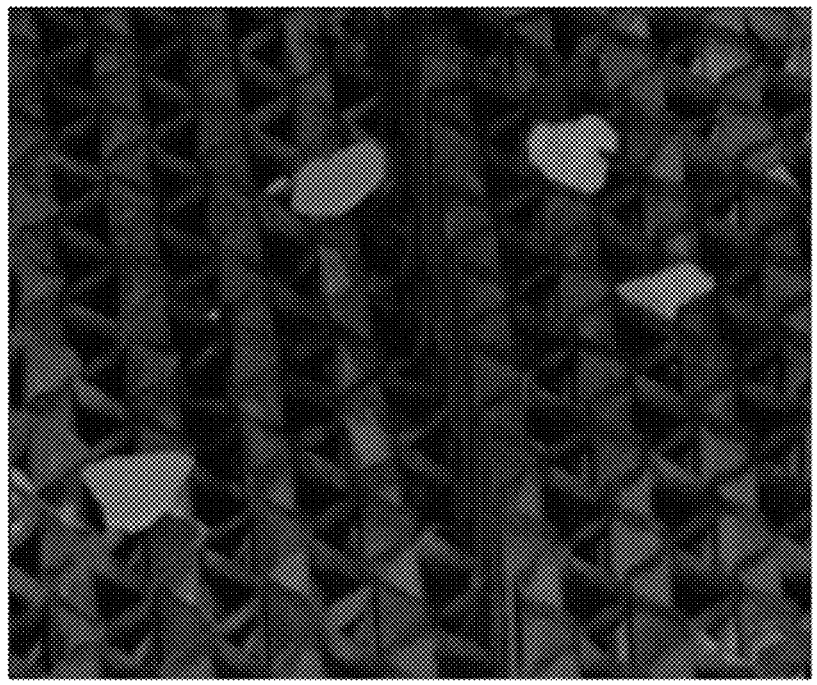
FIGS. 7A and 7B are photographs that show pieces of Sulfur Scale expelled from geothermal cooling tower nozzles after treatment with the present formulation having Formula (I).
Figure 7B:
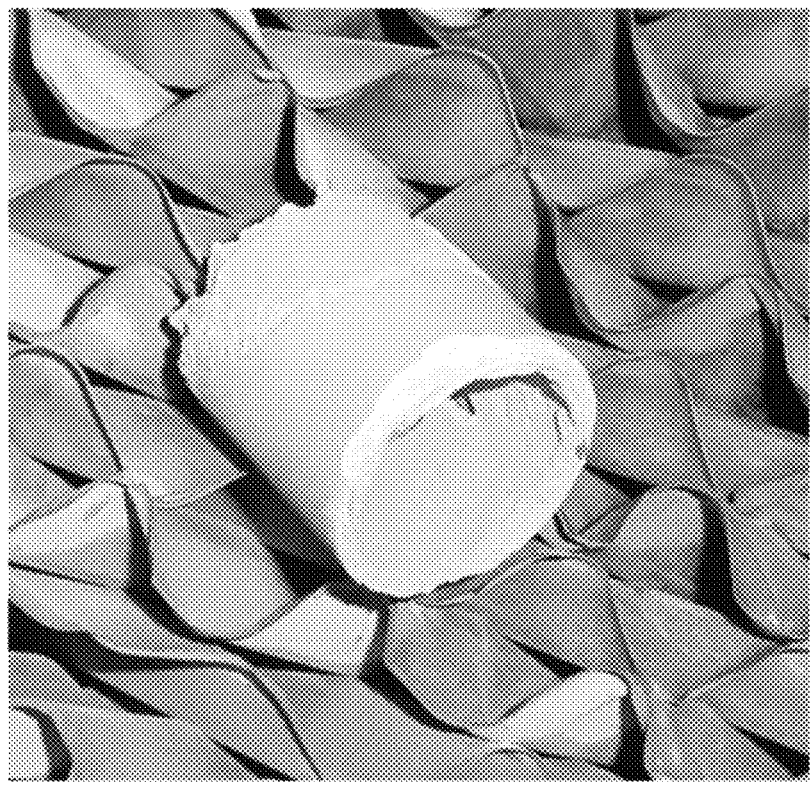
Figure 10:
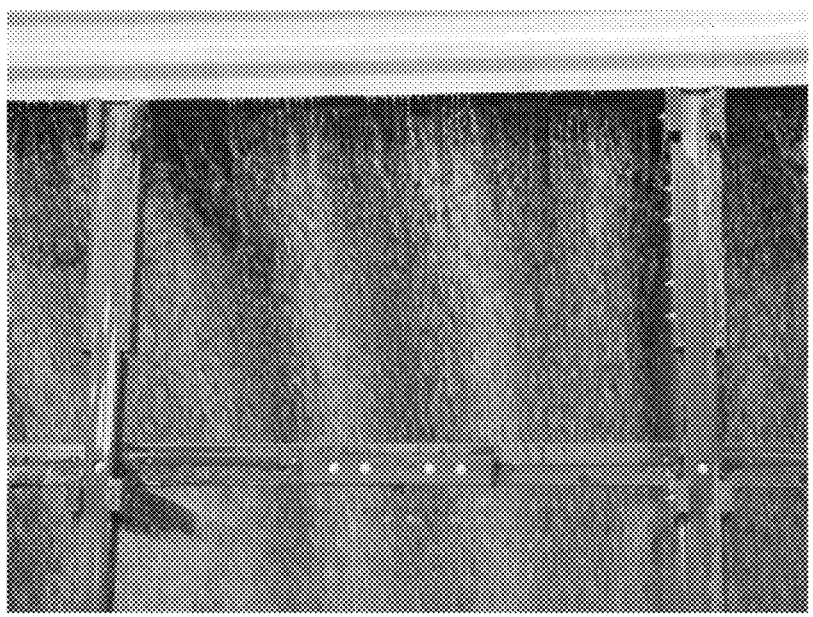
FIG. 10 is a photograph that shows poor water distribution in a geothermal system.

An estimate of 400,000 gallons of water in a cooling tower was treated with 20 gallons of 15% by wt of a formulation of a compound of Formula (I) (7.5 ppm active ingredient). The formulation loosened and removed the sulfur deposits from the nozzles. Sulfur was observed residing on the underlying fill (see FIGS. 7A and 7B). Other evidence of improved performance by use of the present formulation are:

1. Thermographic Analysis of Return Water in Cooling Tower:

The temperature of the cold water return flow measured horizontally across the flow as shown in FIG. 10 was compared for a system that was treated with the present formulation and an untreated system. The untreated system showed higher temperatures (30-44° C.) and the treated system showed lower temperatures (28-36° C.), which result demonstrates improved performance of the cooling system.

2. Turbidity:

The turbidity of the water in the cooling tower basin showed an increase from 4 to 60 FAU over a three-week period in which treatment with the present formulation was performed. This result demonstrates the removal of Sulfur Scale from the internal surfaces.

3. Average Condenser Vacuum:

The average condenser vacuum was measured at 8 AM each day over a three-month period for four cooling towers. One tower was treated with the present formulation and the other three were untreated. The treated tower showed a vacuum of 75 mm Hg which was better than the others that ranged from 87-98 mm Hg.

Figure 4:
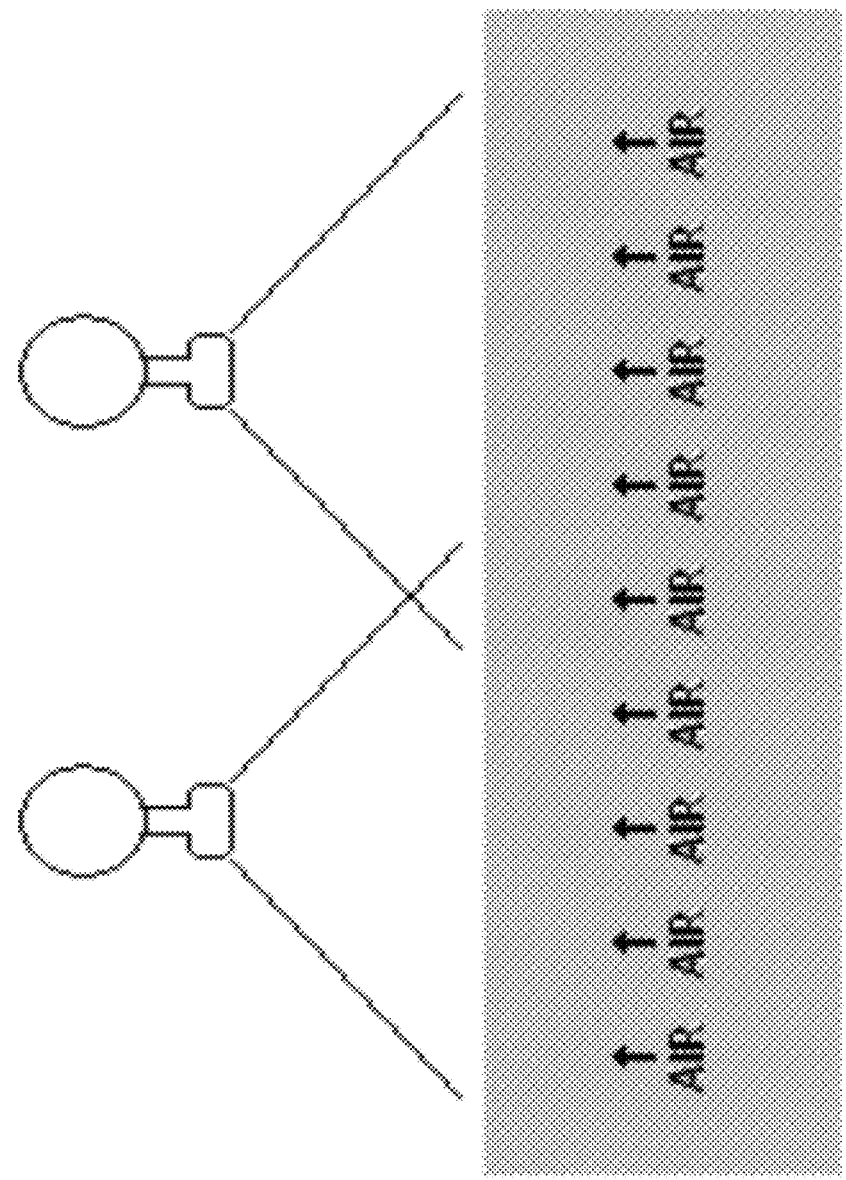
FIG. 4 illustrates by computer graphics the proper mixing of air and water.

4. Average Fan Amperage:

Upon treatment of the cooling tower with the present formulation over a one-month period, the average current that the fans drew increased from 128 to 134 amps. This result indicates a more efficient mixing of air with the cooling water (as illustrated in FIG. 4) and more resistance to air flow, requiring greater current to power the fans. An increase in fan amps indicates less Sulfur Scale fouling and better performance of the cooling tower.

Figure 8A:
FIG. 8A is a photograph that shows a nozzle in which Sulfur Scale has been removed by treatment of the present formulation having Formula (I).
Figure 8B:
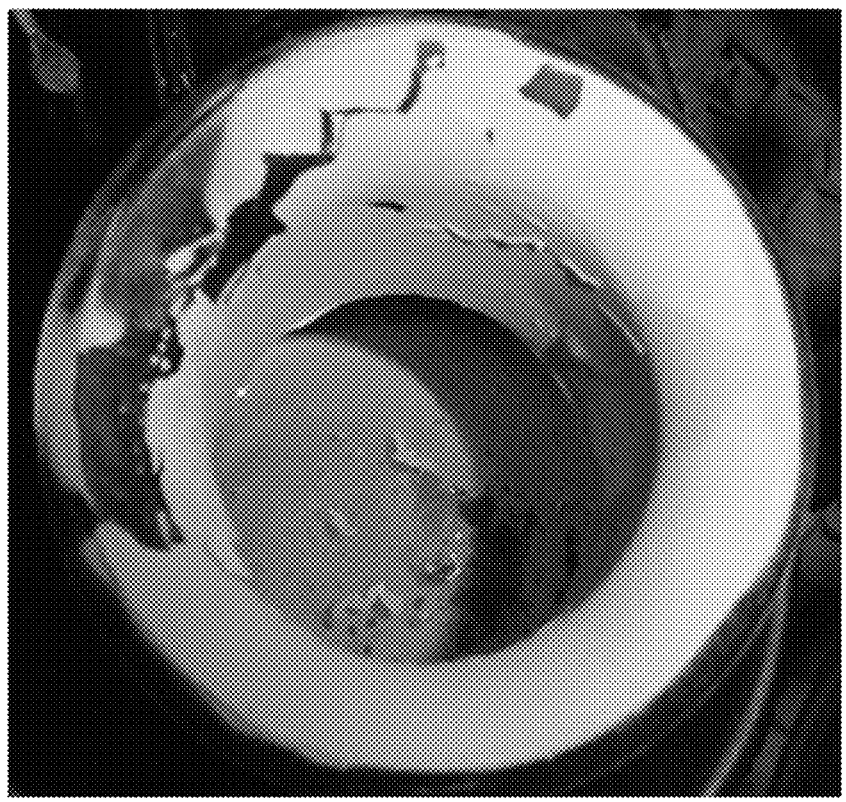
FIG. 8B shows a nozzle in which Sulfur Scale has been removed by treatment of the present formulation of Formula (I), followed by a time when there has been no treatment with the present formulation, showing new development of Sulfur Scale.
Figure 9:
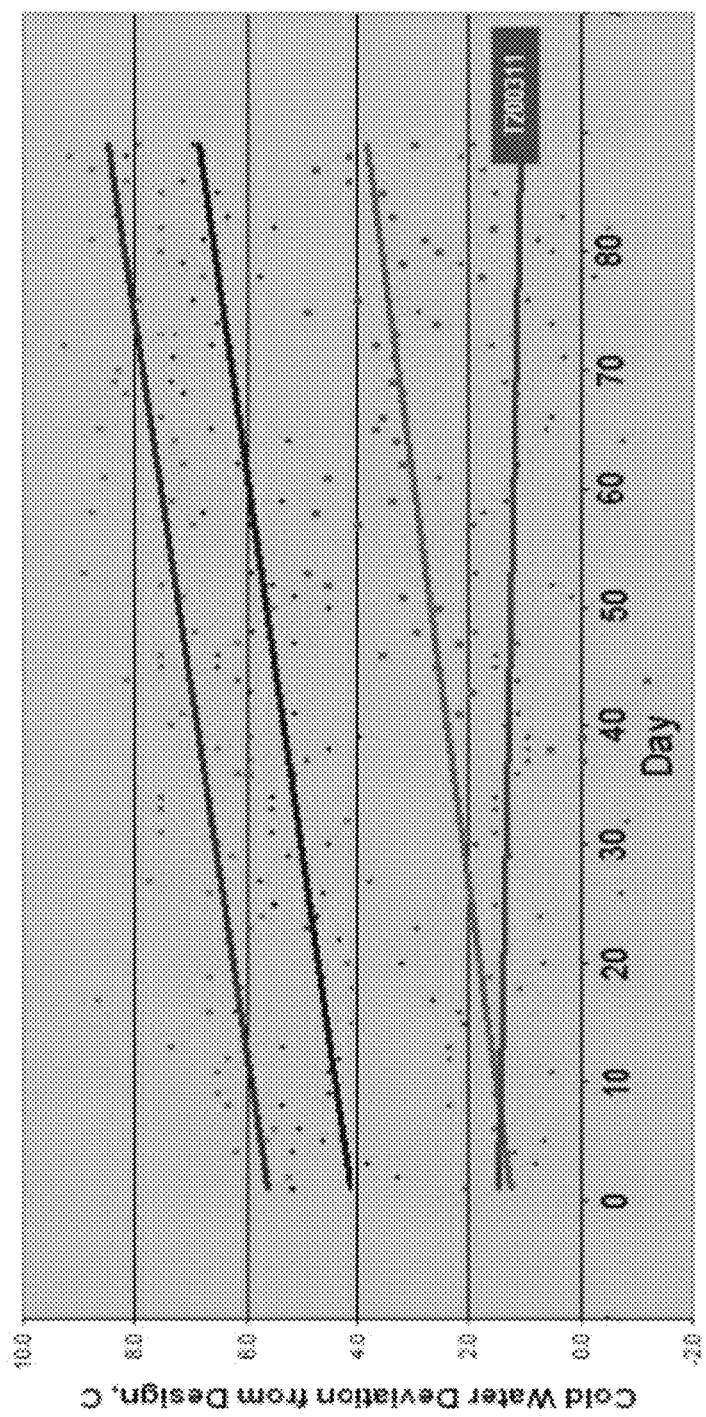
FIG. 9 shows a graphic plot of tower performance in terms of cold water temperature (deviation from design) versus time in a geothermal cooling tower. The line marked T200311 represents the tower treated with the present formulation having compounds of Formula (I). The other lines represent towers that were not treated with the present formulation.

In addition, the formulation inhibited formation of new Sulfur deposits. This is evidenced in two ways:

(1) Ceasing use of formulation: After successful treatment with the formulation, when treatment was then discontinued, Sulfur deposition increased. It was evident from examining the nozzles that were previously treated with the formulation and had expelled Sulfur (see FIG. 8A), that new Sulfur deposits were beginning to form (see FIG. 8B). These nozzles had a different thickness indicating development of a new deposit; or (2) Continuous treatment: Upon continued treatment with the present formulation, no new Sulfur deposition was visually observed. One month into a trial, a cell in one tower was inspected. Every nozzle orifice was completely clean. There was no Sulfur build-up on the fill. After 78 days of treatment with the present formulation, the performance of the tower had improved. Cold water temperatures trended lower (see FIG. 9). Three similar towers that were not treated with the formulation declined in performance over the same period. Overall, the tower treated with the present formulation resulted in improved cold water temperature and condenser vacuum. As a result of the treatment with this formulation, electrical power output from the utility improved at a lower cost.

Example 2

Figure 11:
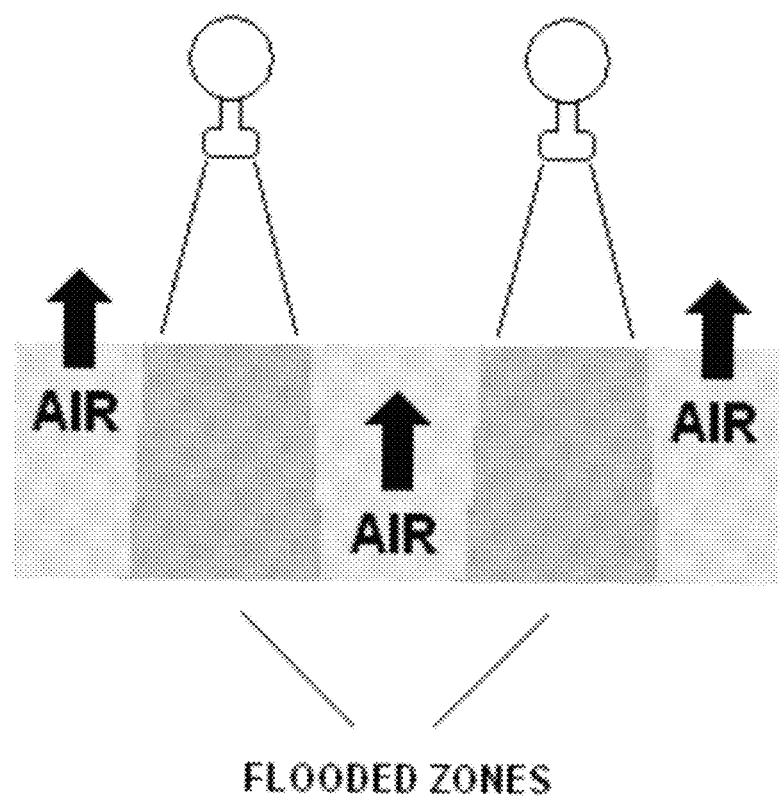
FIG. 11 illustrates by computer graphics channeling of the air and water flow that result in FIG. 10 from poor distribution.

When geothermal towers are experiencing water distribution problems (see FIG. 10) often the nozzles and fill leads have Sulfur deposits. When the Sulfur deposits on the wetted surfaces of the nozzle, it will build to a significant depth at the nozzle orifice. This deposit changes the way the water emerges from the orifice and interacts with the impingement plate and results in a gradual narrowing of the spray pattern resulting in poor water distribution at the top of the fill. The water flow is concentrated directly underneath each nozzle, flooding these areas and leaving most of the rest of the fill nearly dry (see FIGS. 4 and 11). Also the water leaving the high flow areas is very hot whereas the water coming from the low flow areas is much cooler.

Example 3

Fill fouling must be caught early or it becomes irreversible. If deposits grow so large that the circulating water cannot reach them (channeling) then treatment chemicals cannot reach them either so chemical cleanings become problematic. Cross corrugated fill is almost impossible to clean mechanically due to its design. Attempts usually lead to damage of the fill and impaction of the deposit material.

Figure 3:
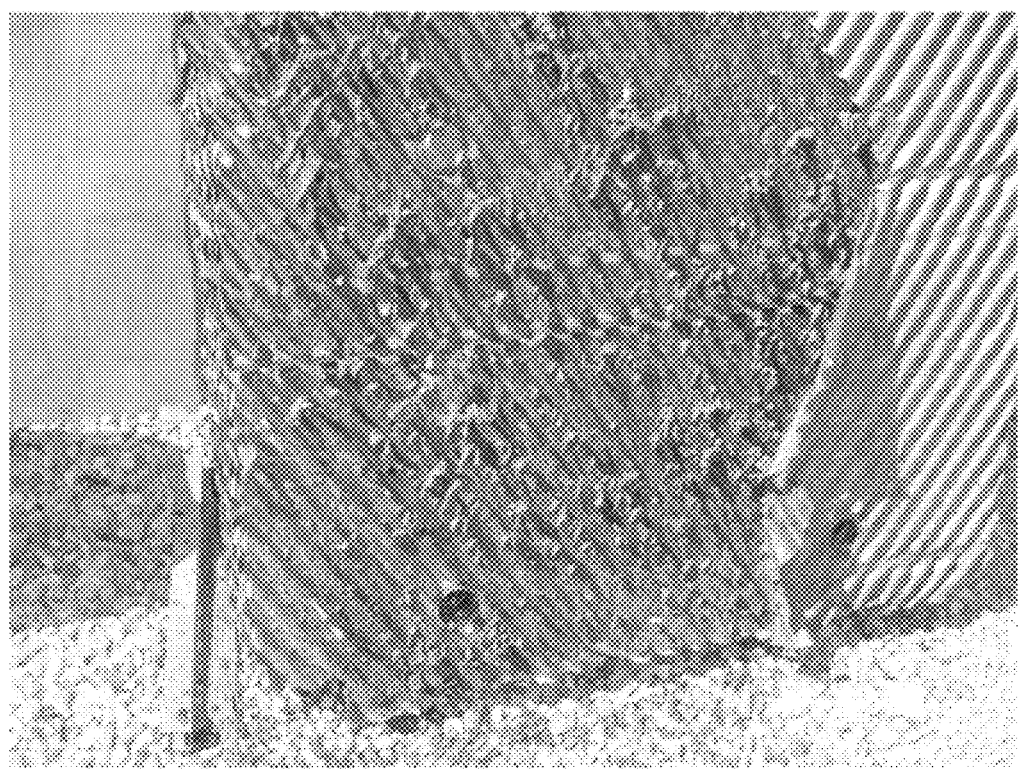
FIG. 3 is a photograph that shows a Sulfur deposit as Sulfur Scale on a fill.

Loss of heat transfer efficiency is a negative consequence of fouling, but if unchecked fouling can cause even more problems. As Sulfur deposits grow, the plastic fill blocks can no longer support them and the fill crushes under its own weight. Mechanically damaged fill must be replaced. The weight of the fill can exceed the tolerance of the structure such that the fill supports collapse and dump the fill into the basin (see FIG. 3). This is very expensive, time consuming and loss of electrical output to the system for such repair.

Example 4

Figure 12A:
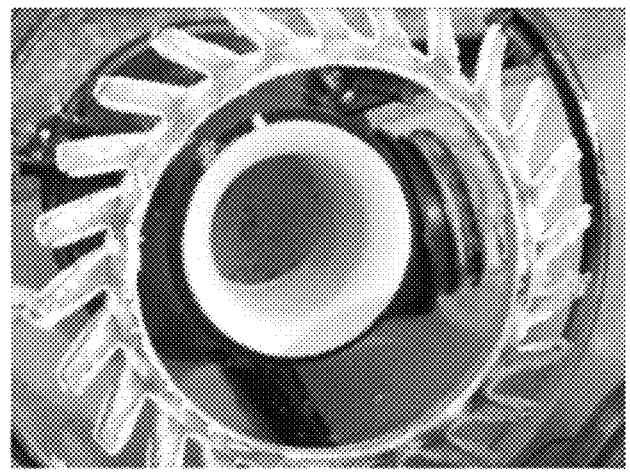
FIG. 12 shows in FIG. 12A a photograph of a nozzle in a geothermal system having Sulfur deposits.
FIG. 12B is a photograph that shows the nozzle after treatment with a formulation of Formula (I)
FIG. 12C is a photograph that shows the effect of a Sulfur deposit on a fill.
Figure 12B:
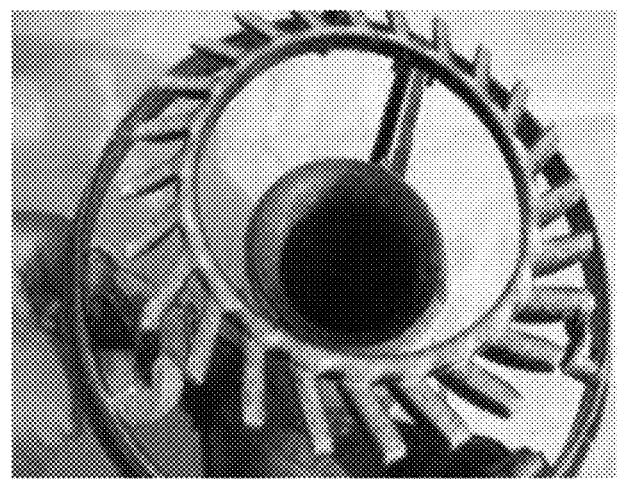
Figure 12C:

In a geothermal system Sulfur deposition causes reduced heat transfer, poor water distribution, disruption of nozzle design, damage to tower fill, and blockage. These issues cause damage to the geothermal system and can significantly affect the electrical output of the plant. FIG. 12A is a photograph of a nozzle with Sulfur deposits that are affecting its function. FIG. 12B shows that nozzle after treatment with a present formulation. FIG. 12C shows the Sulfur deposit on the fill from the nozzle. Sulfur deposit accumulation in spray nozzles reduces the size of the spray pattern, resulting in damage to the tower fill. Uneven hot water distribution from fouled nozzles results in channeled air flow and poor cooling efficiency. Thus removal of such Sulfur deposit is desired but once it has hardened it is very difficult to do.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A method using a formulation for Sulfur Scale Control in Industrial Water Systems consisting essentially of a liquid, emulsion, suspension or solid formulation having as its active ingredient at least one compound of Formula (I)

wherein:
R is a straight chain or branched chain $C_6$-$C_{24}$ alkyl or a straight chain or branched chain $C_6$-$C_{24}$ alkyloxy-$C_2$-$C_3$-alkyl;
$R^1$ is a straight chain or branched chain $C_2$-$C_4$ alkyl; and
X is S, O or N—$R^2$ wherein $R^2$ is H or a straight chain or branched chain $C_1$-$C_8$ alkyl; or
organic or inorganic acid addition salts thereof;
wherein the Sulfur is elemental sulfur, and wherein the method comprises:

(1) for Sulfur Scale Control in an Industrial Water System the steps of:
   (a) adding the formulation containing the compounds of Formula (I) as a Removal Agent, in a daily slug dose, in a concentration of the active ingredient of from about 0.1 to about 10,000 ppm in the water being treated in the Industrial Water System, for about 7 days to about 2 months; and
   (b) observing the Sulfur Scale Control by visualization of Sulfur Scale Removal from the surfaces of the components of the Industrial Water System and/or testing the water in the Industrial Water System for Sulfur; and/or
(2) for Sulfur Scale Control in an Industrial Water System the steps of:
   (a) adding the formulation containing the compounds of Formula (I) as an Inhibition Agent, in a continuous or semi-continuous dose, in a concentration of the active ingredient of from about 0.1 to about 10,000 ppm in the water being treated for Sulfur Scale Control in the Industrial Water System, and
   (b) continuing such treatment with the formulation for as long as needed to inhibit Sulfur Scale as evidenced by visualization of the surfaces of the components of the Industrial Water System and/or testing the water in the Industrial Water System for Sulfur.

2. The method of claim 1 wherein X is S.

3. The method of claim 2 wherein the compound is 2-(decylthio)ethanamine hydrochloride.

4. The method of claim 1 wherein X is O.

5. The method of claim 1 wherein the formulation has at least one additional Other Ingredient present.

6. The method of claim 5 wherein the Other Ingredient is one or more of water, solvents, diluents, excipients, biocides, stabilizers, surfactants, dispersants, corrosion inhibitors, scale inhibitors, or antifoaming agents.

7. The method of claim 6 wherein the Other Ingredient is one or more of biocides, corrosion inhibitors, scale inhibitors, or dispersants.

8. The method of claim 6 wherein the Other Ingredient is one or more of stabilizers, surfactants, antifoaming agents, water, solvents, diluents or excipients.

9. The method of claim 1 wherein the Industrial Water System is a cooling tower, paper mill, metal working fluid, Frasch process sulfur mining system, reinjection water such as produced water from oil production, flooding water used in secondary oil recovery, heat exchangers, geothermal systems, fluid coolers, hydrotesting of pipelines, water treatment or purification plants and equipment, including reverse osmosis membranes, ultrafiltration or ion exchange.

10. The method of claim 9 wherein the Industrial Water System is a geothermal system.

11. The method of claim 1, 9 or 10 wherein the Sulfur Scale is removed after it has formed a deposit.

12. The method of claim 1, 9 or 10 wherein the Sulfur Scale is inhibited from forming.

13. The method of claim 9 wherein the Industrial Water System is water treatment plants or equipment, including reverse osmosis membranes.

14. The method of claim 1 or 9 wherein the Sulfur Scale Control formulation of Formula (I) is a Sulfur Inhibition Agent.

15. The method of claim 1 or 9 wherein the Sulfur Scale Control formulation of Formula (I) is a Sulfur Removal Agent.

16. The method of claim 1 wherein the acid addition salt of Formula (I) is formed from hydrochloric acid, hydrobromic acid, sulfuric acid, phosphoric acid, acetic acid, citric acid, propionic acid or HEDP.

17. The method of claim 1 wherein the concentration of the active ingredient of Formula (I) in the formulation is from about 1 to about 500 ppm in the water being treated in the Industrial Water System.

18. The method of claim 1 wherein the concentration of the active ingredient of Formula (I) in the formulation is from about 5 to about 50 ppm in the water being treated in the Industrial Water System.

* * * * *